(12) United States Patent
Liang

(10) Patent No.: US 11,402,044 B2
(45) Date of Patent: Aug. 2, 2022

(54) QUICK PIPE CONNECTOR

(71) Applicant: Hewen Liang, Yuhuan (CN)

(72) Inventor: Hewen Liang, Yuhuan (CN)

( * ) Notice: Subject to any disclaimer, the term of this patent is extended or adjusted under 35 U.S.C. 154(b) by 207 days.

(21) Appl. No.: 16/784,004

(22) Filed: Feb. 6, 2020

(65) Prior Publication Data

US 2021/0003239 A1    Jan. 7, 2021

(30) Foreign Application Priority Data

Jul. 2, 2019  (CN) .......................... 201921019894.3

(51) Int. Cl.
*F16L 37/091* (2006.01)

(52) U.S. Cl.
CPC .................. *F16L 37/091* (2013.01)

(58) Field of Classification Search
CPC ... F16L 37/091; F16L 37/0915; F16L 37/098; F16L 37/0982
USPC ................................... 285/39, 321
See application file for complete search history.

(56) References Cited

U.S. PATENT DOCUMENTS

| 2009/0001712 | A1* | 1/2009 | Webb | F16L 37/091 |
| | | | | 285/55 |
| 2010/0088869 | A1* | 4/2010 | Webb | F16L 37/0915 |
| | | | | 29/237 |
| 2012/0074695 | A1* | 3/2012 | Salehi-Bakhtiari | ......... |
| | | | | F16L 37/0915 |
| | | | | 285/377 |

\* cited by examiner

*Primary Examiner* — Aaron M Dunwoody
(74) *Attorney, Agent, or Firm* — Tsz Lung Yeung

(57) ABSTRACT

A quick pipe connector includes a connector body, a sealing ring, a compression ring, an engaging member, a fastening cover, and a connector socket. The sealing ring and the compression ring are disposed at fifth and fourth opening portions of the connector body respectively. The fastening cover is disposed at third and second opening portions of the connector body. The fastening cover is biased against a first shouldering surface. The compression ring is disposed at the fourth opening portion and is biased against a second shouldering surface to limit the sealing ring located between a third shouldering surface and the compression ring. A mounting portion of the engaging member is limited between the fastening cover and the compression ring. The connector socket is inserted into the fastening cover that a fifth shouldering surface of the connector socket is engaged with an annular protruding rim of the fastening cover.

4 Claims, 6 Drawing Sheets

| Test Pressure (Mpa) | Test Result-Prior art | Test Result-Present invention |
| --- | --- | --- |
| 2.0 | pass | pass |
| 3.0 | pass | pass |
| 4.0 | pass | pass |
| 5.0 | fail | pass |
| 6.0 | - | pass |
| 7.0 | - | pass |
| 8.0 | - | pass |
| 9.0 | - | pass |
| 10.0 | - | pass |

FIG. 10

QUICK PIPE CONNECTOR

CROSS REFERENCE TO RELATED APPLICATION

This is a non-provisional application which claims priority to a Chinese application having an application number of CN 201921019894.3, and a filing date of Jul. 2, 2019, the entire contents of this foreign application is hereby incorporated by reference.

BACKGROUND OF THE PRESENT INVENTION

Field of Invention

The present invention relates to a connector, and more particularly to a quick pipe connector adapted for rapidly connecting two pipes in a detachably connecting manner.

Description of Related Arts

A quick connector is a device for a quick connection between two piping elements, such as between two pipes or between a water pipe and a water sprinkler. The quick connector has the advantages of quickly assembling two piping elements and easily disassembling two piping elements.

As shown in FIG. 1 and FIG. 2 of the drawings, Chinese patent number, CN201326855Y, publication date Oct. 14, 2009, disclosed a "Quick Pipe Connector" for quickly connecting a water pipe, wherein the quick pipe connector comprises an outer tube 1 having a hollow structure, an assembling unit, and a water sealing ring 2. The outer pipe 1 comprises a pipe wall defining an axis and a receiving cavity 3 for receiving one end of the water pipe. The pipe wall has an outer end surface 4, a first inner peripheral surface 5, a second inner peripheral surface 6, a first shouldering surface 7, a third inner peripheral surface 8 and a second shouldering surface 9. The first inner peripheral surface 5 is extended from the outer end surface 4. The second inner peripheral surface 6 is extended from a side edge of the first inner peripheral surface 5 which is opposite to an opposed side edge of the first inner peripheral surface 5 extended to the outer end surface 4, wherein a diameter of the second inner peripheral surface 6 is greater than a diameter of the first inner peripheral surface 5. The first shouldering surface 7 is extended between the first and second inner peripheral surfaces 5, 6. The third inner peripheral surface 8 is extended from one side edge of the second inner peripheral surface 6 which is opposite to an opposed side edge of the second inner peripheral surface 6 extended to the first shoulder surface 7. The third inner peripheral surface 8 has a maximum diameter relative to the axis which is smaller than a diameter of the second inner peripheral surface 6. The second shoulder surface 9 is extended between the second and third inner peripheral surfaces 6, 8. The assembling unit comprises a holding ring 10, a locking ring 11 and a releasing ring 12. The holding ring 10 is disposed in the receiving cavity 3 for holding one end of the water pipe. The locking ring 11 is disposed in the receiving cavity 3, wherein the locking ring 11 is biased against the first shouldering surface 7 to push the holding ring 10 against the second shouldering surface 9 in the receiving cavity 3. The locking ring 11 has an outer locking peripheral surface 13, an inner locking peripheral surface 14 opposite to the outer locking outer peripheral surface 13 in a radial direction with respect to the axis, and a notch 15 which is extended from the inner locking peripheral surface 14 to the outer locking peripheral surface 13 and is extended parallel to the axis. The inner locking peripheral surface 14 has an inner peripheral shoulder 16 extended perpendicularly and configured for a fastening surface 17 of the releasing ring 12.

The releasing ring 12 is move along the axis to the locking ring 11 to its releasing position. Accordingly, at the releasing position, the fastening surface of the releasing ring 12 is disengaged with the inner peripheral shoulder 16 to releasing a holding force of the holding ring 10 within the receiving cavity 3 to the end of the water pipe. The water sealing ring 2 is disposed in the receiving cavity 3 to bias against the water pipe so as to seal the end of the water pipe in the receiving cavity 3.

However, the above-mentioned quick pipe connector has several disadvantages. The locking ring 11 must have the notch 15, and the strength of the locking ring 11 is generally weak. These lead to poor overall connection configuration between two corresponding pipes.

SUMMARY OF THE PRESENT INVENTION

Certain variations of the present invention provide a quick pipe connector, which provides a high strength, simple and rapid connection configuration for connecting to a water pipe.

In one aspect of the present invention, it provides a quick pipe connector, comprising:

a connector body having a central hole formed in an axial direction of the connector body, wherein the central hole may be a through hole or a blind hole, wherein the connector body further has a first opening portion, a fastening cover mounting portion, a fourth opening portion, and a fifth opening portion sequentially formed from an opening of the connector body, wherein a diameter of the fourth opening portion is larger than a diameter of the fifth opening portion, wherein the connector body further has a first shouldering surface formed between the first opening portion and the fastening cover mounting portion, a second shouldering surface formed between the fourth opening portion and the fifth opening portion, and a third shouldering surface formed between the fifth opening portion and the central hole;

a sealing ring disposed at the fifth opening portion of the connector body;

a compression ring having an inner through hole extended in an axial direction, wherein the compression ring is disposed at the fourth opening portion of the connector body at a position that a first end of the compression ring is biased against the second shouldering surface to limit the sealing ring located between the third shouldering surface and the first end of the compression ring;

an engaging member which has a mounting portion and a plurality of engaging teeth extended therefrom;

a fastening cover having a circular shape with closed loop structure, wherein the fastening cover comprises an annular protruding rim inwardly and radially protruded from an inner circumferential wall of the fastening cover toward a center thereof, wherein the fastening cover is disposed at the fastening cover mounting portion of the connector body, wherein a second end the fastening cover is biased against the first shouldering surface, wherein the mounting portion of the engaging member is limited between a first end of the fastening cover and a second end of the compression ring, wherein the engaging teeth are extended into the inner through hole of the compression ring; and a connector socket which comprises a socket body having a tubular configuration and defining a first end and an opposed second end, wherein the socket body has a tapered surface extended on an outer peripheral surface of the socket body from the first end thereof, wherein a fifth shouldering surface is formed between the tapered surface and the outer peripheral surface of the socket body, wherein the connector socket is slidably and coaxially inserted into the fastening cover at a position that the fifth shouldering surface of the connector socket is slidably passed through the annular protruding rim of the fastening cover to engage therewithin.

This summary presented above is provided merely to introduce certain concepts and not to identify any key or essential features of the claimed subject matter.

BRIEF DESCRIPTION OF THE DRAWINGS

FIG. 10 is table showing a result of water leakage test between the prior art and the present invention in response to water pressure.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", "vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Figure 1:
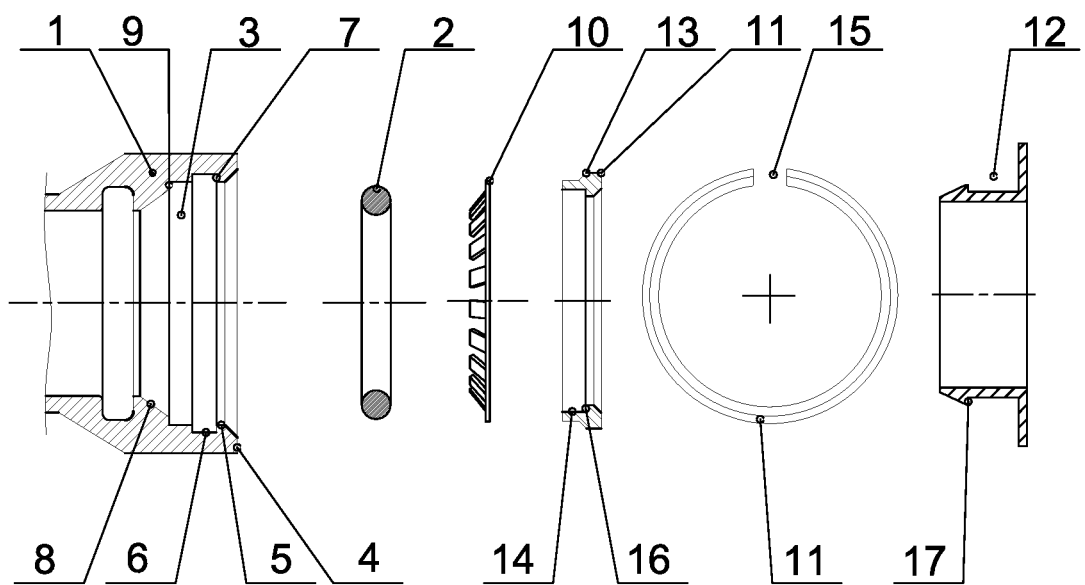
FIG. 1 is an exploded perspective view of a conventional quick pipe connector.
Figure 2:
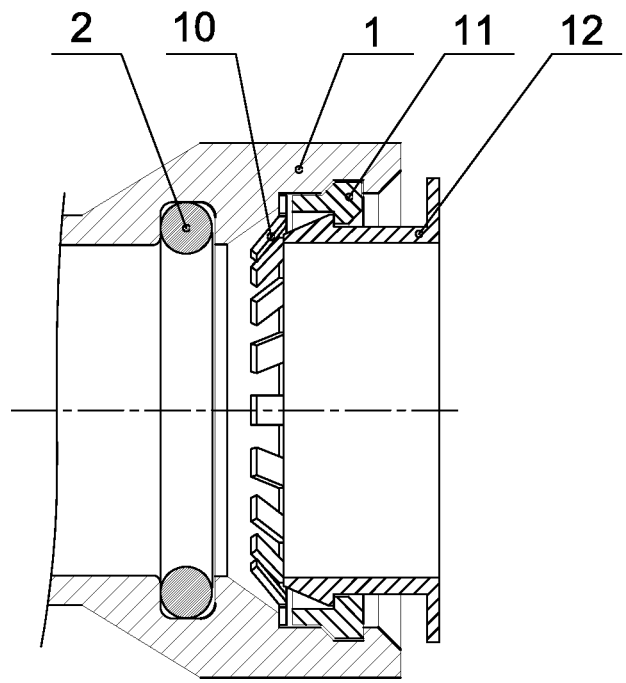
FIG. 2 is a sectional view of the conventional quick pipe connector.
Figure 3:
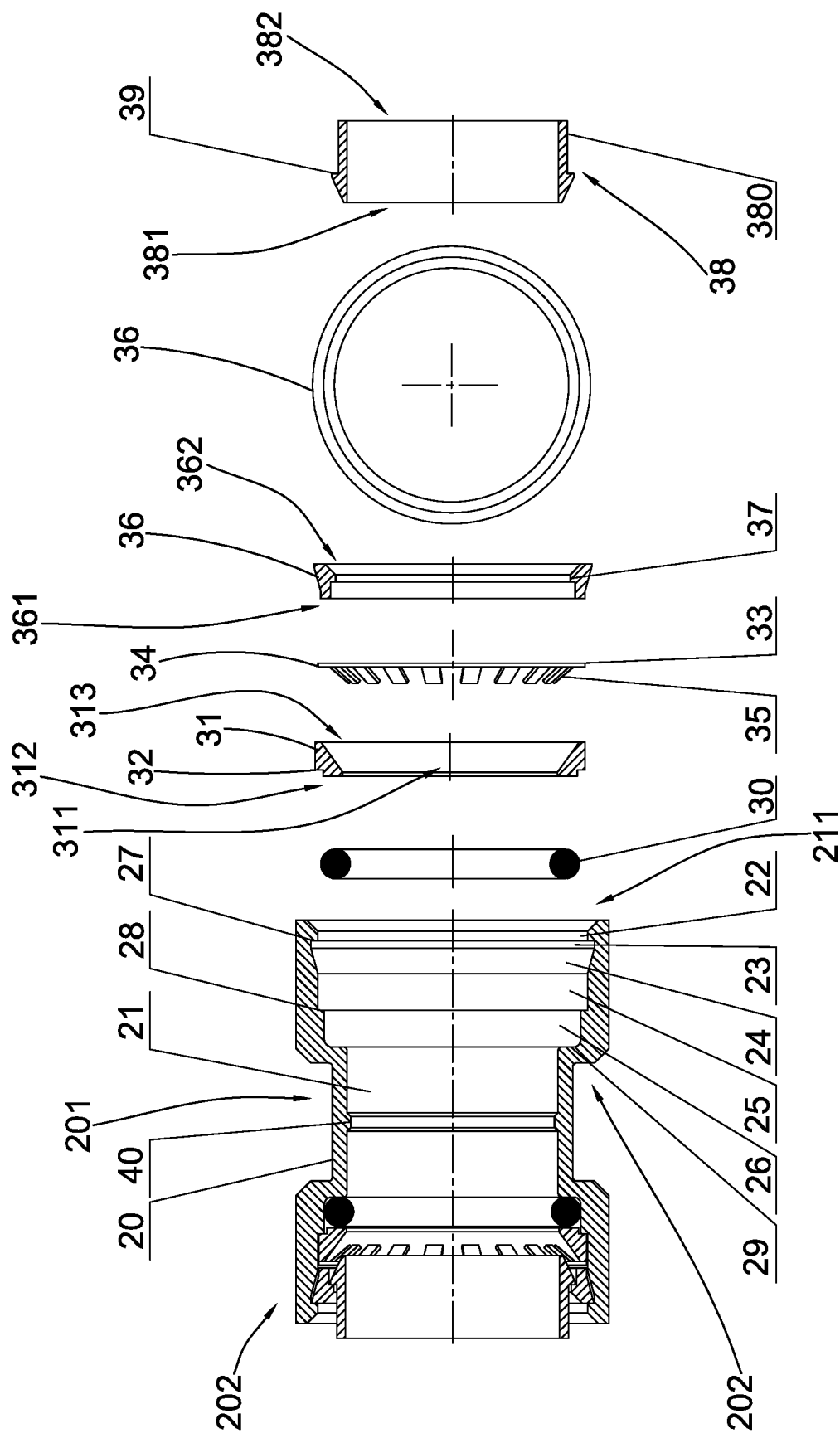
FIG. 3 is an exploded view of a quick pipe connector according to a first embodiment of the present invention, illustrating a through hole of a connector body.
Figure 4:
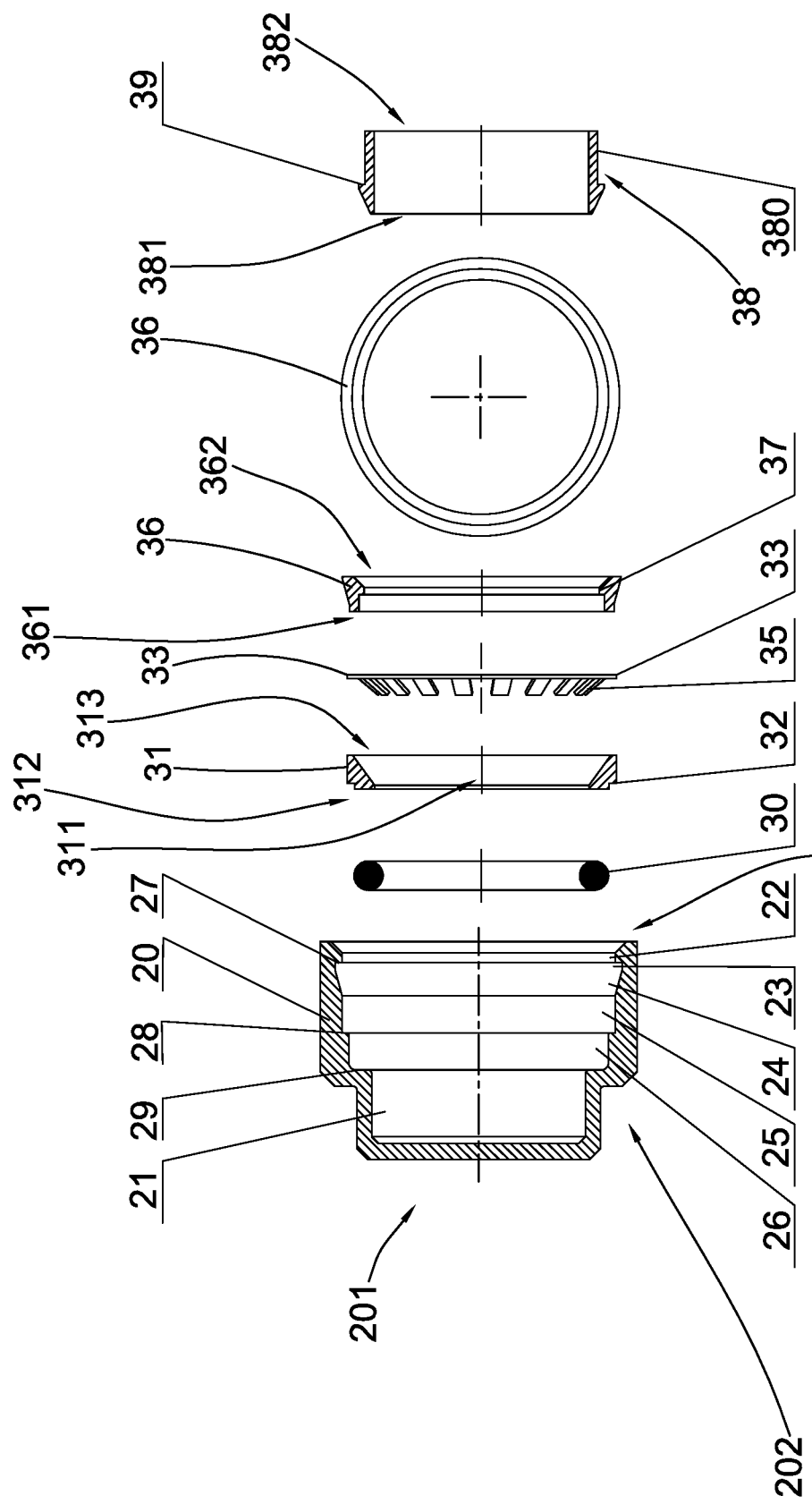
FIG. 4 is an exploded view of the quick pipe connector according to the first embodiment of the present invention, illustrating a blind hole of a connector body.
Figure 5:
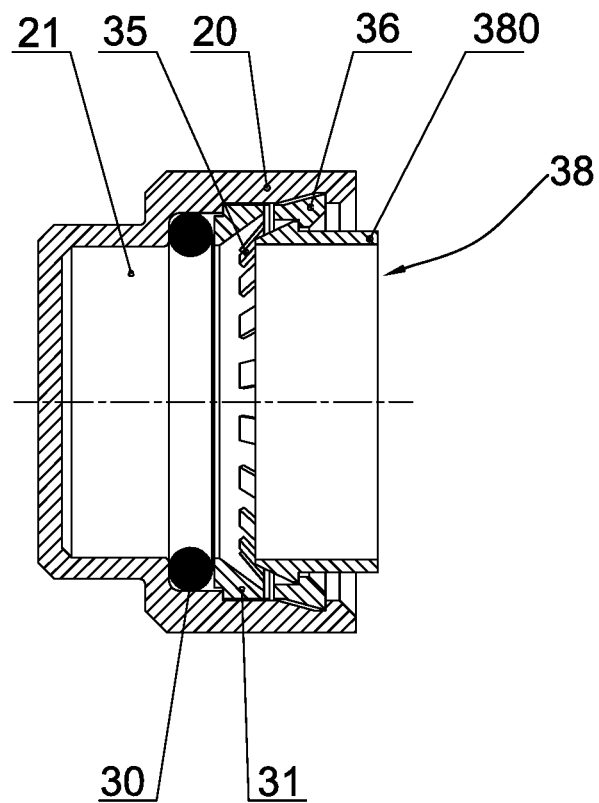
FIG. 5 is a sectional view the quick pipe connector according to the first embodiment of the present invention, illustrating the blind hole of the main body.

Referring to FIG. 3 to FIG. 5 of the drawings, a quick pipe connector according to a first preferred embodiment of the present invention is illustrated. Broadly, the quick pipe connector may comprise a connector body 20, a sealing ring 30, a compression ring 31, an engaging member 33, a fastening cover 36, and connector socket 38.

The quick pip connector may comprise a connector body 20 having a central hole 21 formed in an axial direction of the connector body 20. The central hole 21 may be a through hole or a blind hole. When the central hole 21 is configured as a through hole, the connector 20 may serve as a pipe connector for coaxially connecting two water pipes end-to-end as shown in FIG. 3 of the drawings. When the central hole 21 is configured as a blind hole, the connector body 20 may serve as a connector cap for capping one end of the water pipe as shown in FIG. 4 of the drawings.

The connector body 20 may further have a first opening portion 22, a second opening portion 23, a third opening portion 24, a fourth opening portion 25, and a fifth opening portion 26 coaxially formed with each other and sequentially formed from an opening of the connector body 20 to the central hole 21. When the central hole 21 is a through hole, two first opening portions 22, two second opening portions 23, two third opening portions 24, two fourth opening portions 25, and two fifth opening portions 26 may be sequentially formed from two openings of the connector body 20 to the central hole 21. A diameter of the fifth opening portion 26 may be smaller than a diameter of the first opening portion 22 which may be smaller than a diameter of the second opening portion 23. On the other hand, a diameter of the fourth opening portion 25 may be larger than the diameter of the fifth opening portion 26.

Each of the first opening portion 22, the second opening portion 23, the fourth opening portion 25 and the fifth opening portion 26 may have a uniform diameter. The third opening portion 24 may have a tapered shape and may be formed as a tapered hole to define a larger diameter edge extended to the second opening portion 23 and a smaller diameter edge extended to the fourth opening portion 25. The second opening portion 23 and the third opening portion 24 may be combined to form a fastening cover mounting portion.

The connector body 20 may further have a first shouldering surface 27 formed between the second opening portion 23 and the first opening portion 22, a second shouldering surface 28 formed between the fourth opening portion 25 and the fifth opening portion 26, and a third shouldering surface 29 formed between the fifth opening portion 26 and the central hole 21. Preferably, the connector body 20 may comprise a first tubular body 201 and a second tubular body 202 coaxially aligned with the first tubular body 201, wherein a diameter of the first tubular body 201 may be smaller than a diameter of the second tubular body 202. The central hole 21 may be formed in the first tubular body 201, while the first opening portion 22, the second opening portion 23, the third opening portion 24, the fourth opening portion 25 and the fifth opening portion 26 may be sequentially formed at the second tubular body 202 from its opening to the central hole 21 of the first tubular body 201. The connector body 20 may comprise a first tubular body 201 located between two second tubular bodies 202, such that the two second tubular bodies 202 are extended oppositely from the first tubular body 201.

The quick pipe connector of the present invention may further comprise a sealing ring 30 coaxially disposed at the fifth opening portion 26.

Moreover, the quick pipe connector may further comprise a compression ring 31 having an inner through hole 311 extended in an axial direction, a first end 312 and an opposed second end 313, wherein the compression ring 31 may be coaxially disposed at the fourth opening portion 25 at a position that the first end of the compression ring 31 may bias against the second shouldering surface 28 to limit the sealing ring 30 located between the third shouldering surface 29 and the first end of the compression ring 31.

For enhancing the sealing effect of the connector body 20 and further limiting the position of the sealing ring 30, the first end 312 of the compression ring 31 may form a narrowed neck end being indented on an outer peripheral wall of the compression ring 31. In other words, an outer diameter of the first end 312 of the compression ring 31 may be reduced to form a grooved surface indented on the outer peripheral wall as the narrowed neck end of the compression ring 31. A fourth shouldering surface 32 may be formed between an outer peripheral wall of the narrowed neck end and the outer peripheral wall of the compression ring 31. The fourth shouldering surface 32 may bias against the second shouldering surface 28. The narrow neck end of the compression ring 31 may coaxially extend into the fifth opening portion 26

The quick pipe connector may further comprise an engaging member 33 which has a mounting portion 34 having a ring shape, and a plurality of engaging teeth 35 spacedly, inclinedly, and radially extended from the mounting portion 34 toward a center thereof in a radial direction.

The quick pipe connector may further comprise a fastening cover 36 having a circular shape with closed loop structure and defining a first end 361 and an opposed second end 362, wherein the fastening cover 36 may comprise an annular protruding rim 37 inwardly and radially protruded from an inner circumferential wall of the fastening cover 36 toward a center thereof. The fastening cover 36 may be coaxially disposed in the fastening cover mounting portion, i.e. the second opening portion 23 and the third opening portion 24, wherein the second end 362 the fastening cover 36 may bias against the first shouldering surface 27. The mounting portion 34 of the engaging member 33 may be limited between the first end 361 of the fastening cover 36 and the second end 313 of the compression ring 31, wherein the engaging teeth 35 may extend into the inner through hole 311 of the compression ring 31.

The quick pipe connector may further comprise a connector socket 38 which comprises a socket body 380 having a tubular configuration and defining a first end 381 sliding in the connection body 20 and an opposed second end 382. The socket body 380 may have a tapered surface extended on an outer peripheral surface of the socket body 380 from the first end 381 thereof, wherein a diameter of the tapered surface of the socket body 380 may gradually increase from the first end 381 of the socket body 380 toward the second end 382 thereof to form a hook end of the socket body 380. A fifth shouldering surface 39 may be formed between the tapered surface and the outer peripheral surface of the socket body 380 that the fifth shouldering surface 39 may be formed at the hook end of the socket body 380. The connector socket 38 may be slidably and coaxially inserted into fastening cover 36 at a position that the fifth shouldering surface 39 of the connector socket 38 may slidably pass through the annular protruding rim 37 of the fastening cover 36 to engage therewithin. The first end 381 of the connector socket 38 may extend into and engaged with the engaging teeth 35 of the engaging member 33

The assembling operation of the quick pipe connector of the present invention may comprise the following steps.

(1) Dispose the sealing ring 30 in the fifth opening portion 26.

(2) Dispose the compression ring 31 in the fourth opening portion 25, wherein the fourth shouldering surface 32 of the compression ring 31 may engage with the second shouldering surface 28 of the connector body 20 to limit the sealing ring 30 between the first end 312 of the compression ring 31 and the third shouldering surface 29 of the connector body 20.

(3) Dispose the engaging member 33 in the fourth opening portion 25, wherein the mounting portion 34 of the engaging member 33 may be coupled at the second end 313 of the compression ring 31 while the engaging teeth 35 of the engaging member 33 may extend into the inner through hole 311 of the compression ring 31.

(4) Press the fastening cover 36 into the second opening portion 23 and the third opening portion 24, wherein the second end 362 of the fastening cover 36 may engage with the first shouldering surface 27 to limit the mounting portion 34 of the engaging member 33 between the first end 361 of the fastening cover 36 and the second end 313 of the compression ring 31. The fastening cover 36 may have a circular shape and may need to be pressed by a special tool.

(5) Insert the connector socket 38 into the fastening cover 36 until the fifth shouldering surface 39 of the connector socket 38 is slidably passed through the annular protruding rim 37 of the fastening cover 36 to engage therewithin.

When connecting the quick pipe connector with a water pipe, the connector socket 38 may be pushed toward the sealing ring 30, wherein the tapered surface of the connector socket 38 may move toward the central hole 21, such that the engaging teeth 35 of the engaging member 33 may slide on the tapered surface of the connector socket 38 to open up a space within the engaging teeth 35. One end of the water pipe may be inserted into the central hole 21 of the connector body 20 through the connector socket 38 and then the connector socket 38 is pulled outwardly opposite to an inserting direction of the water pipe. The engaging teeth 35 of the engaging member 33 may slide on the tapered surface of the connector socket 38 to close the space within the engaging teeth 35. Therefore, the engaging teeth 35 are engaged with an outer wall of the water pipe to lock up the water pipe.

In order to conveniently limit the insertion position of the water pipe, the connector body 20 may further comprise a protruding rim 40 protruded from the inner wall of the central hole 21, such that when the water pipe is inserted into the connector body 20, the end of the water pipe may be blocked by the protruding rim 40 to prevent the further inserting movement of the water pipe. In other words, when two water pipes are inserted into the connector body 20, the protruding rim 40 may be located between two ends of the water pipes to block the further inserting movement of each of the water pipes In order to detach the water pipe from the connector body 20, the connector socket 38 may be pushed toward the sealing ring 30, such that the space within the engaging teeth 35 of the engaging member 33 may be opened up by the tapered surface of the connector socket 38 for allowing the water pipe being easily pulled out of the connector body 20. Therefore, the assembling and disassembling operation of the water pipe is simple and easy. In other words, the connector socket 38 may be moved between a locked position and an unlocked position. At the locked position, the connector socket 38 may move away from the sealing ring 30, such that the engaging teeth 35 may move toward the center of the mounting portion 34 to engage with the outer surface of the water pipe. At the unlocked position, the connector socket 38 may move toward the sealing ring 30, such that the engaging teeth 35 may move away from the center of the mounting portion 34 to disengage with the outer surface of the water pipe Furthermore, the inner through hole 311 of the compression ring 31 may be configured as a tapered hole, wherein a first opening diameter of the compression ring 31 at the first end 312 may be smaller than an opposed second opening diameter of the compression ring 31 at the second end 313. The inner through hole 311 of the compression ring 31 with the tapered configuration provides enough space for the engaging teeth 35 of the engaging member 33 to deform, i.e. the engaging teeth 35 are moved toward or away from the center of the engaging member 33.

In order to facilitate the insertion of the connector socket 38, the fastening cover 36 may further comprise a chamfered edge formed at an inner surface thereof at the second end of the fastening cover 36, wherein a smaller diameter edge of the chamfered edge may extend from the annular protruding rim 37 of the fastening cover 36.

The first end 361 and the second end 362 of the fastening cover 36 at the outer wall surface may be configured as first and second cylindrical surfaces respectively. The outer wall surface of the fastening cover 36 may form a tapered surface extended from the first end 361 to the second end 362 thereof. A diameter of the second cylindrical surface may be approximately equal to the larger diameter edge (the second end 362) of the tapered surface of the fastening cover 36. A diameter of the first cylindrical surface may be approximately equal to the smaller diameter edge (the first end 361) of the tapered surface of the fastening cover 36. The tapered surface of the outer side wall of the fastening cover 36 may facilitate to press into the second opening portion 23 and the third opening portion 24.

In the first embodiment of the present invention, the first opening portion 22 and the fourth opening portion 25 may have the same diameter. Alternatively, the diameter of the first opening portion 22 may slightly be larger than the diameter of the fourth opening 25.

In order to facilitate installation of the above-mentioned components, the first opening portion 22 may have a chamfered edge 221 extended from the opening of the connector body 20 for guiding purpose.

In addition, one end of the tapered surface of the connector socket 38 close to the fifth shouldering surface 39 is formed with a cylindrical surface, wherein an outer diameter of the cylindrical surface of the connector socket 38 may be equal to the smaller diameter edge of the tapered surface (the first end 381 of the connector 38). In other words, a diameter at the first end 381 of the connector 38 may be the same as a diameter of the second end 382 thereof. The cylindrical surface may be provided for simplifying manufacturing processing, and the sharp angle formed between the tapered surface and the end surface may prevent a user of the present invention from being accidentally scratched.

According to the first preferred embodiment of the present invention, the second opening portion 23 and the third opening portion 24 may be configured to be integrated and combined to form the fastening cover mounting portion having a tapered slot. An inner diameter of the larger diameter end of the tapered slot forms an inner diameter of the second opening portion 23 and an inner diameter of the smaller diameter end of the tapered slot forms an inner diameter of the fourth opening portion 25.

In order to save the material usage and reduce the costs, the diameter of the first tubular body 201 may be smaller than the diameter of the second tubular body 202. The central hole 21 may be defined at the first tubular body 201, while the first opening portion 22, the second opening portion 23, the third opening portion 24, the fourth opening portion 25 and the fifth opening portion 26 may be sequentially formed at the second tubular body 202 from its opening to the central hole 21 of the first tubular body 201.

Referring to FIG. 6 to FIG. 9 of the drawings, a quick pipe connection according to a second preferred embodiment of the present invention is illustrated. The structural configuration of the second preferred embodiment is the same as that of the first embodiment, except the fastening cover 36 and the connector body 20.

Figure 8:
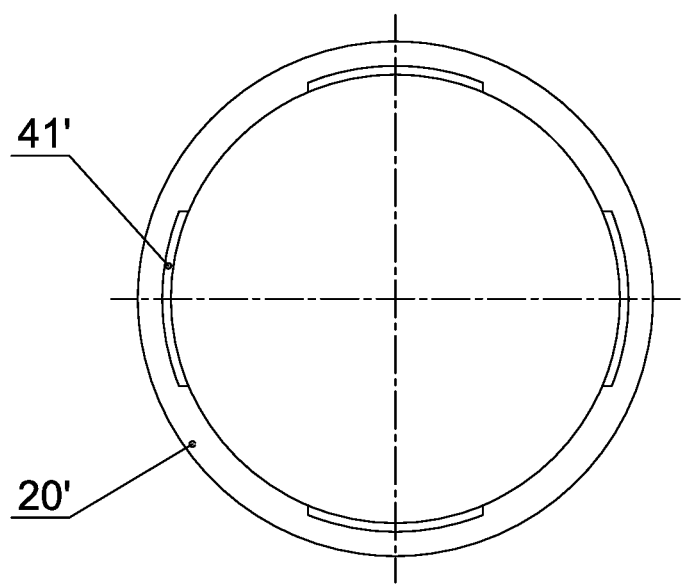
FIG. 8 is a top view of the connector body of the quick pipe connector according to the second embodiment of the present invention.
Figure 9:
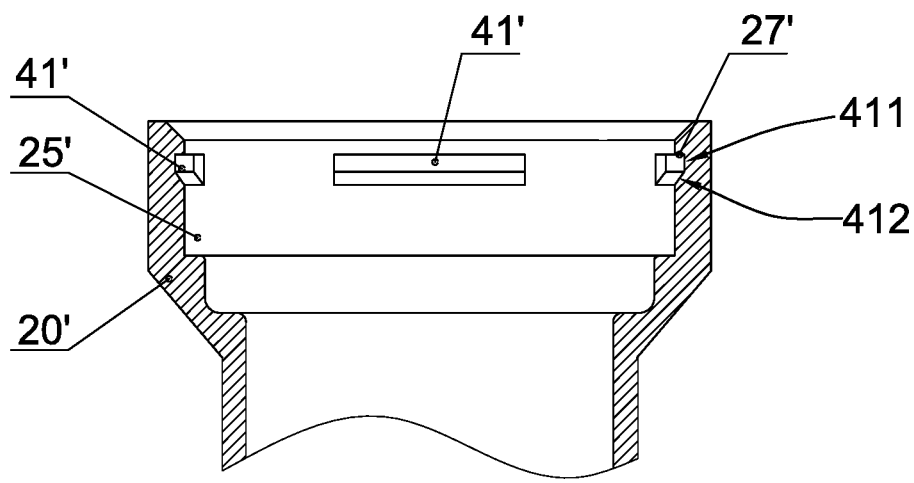
FIG. 9 is a perspective view of the connector body of the quick pipe connector in FIG. 8 according to the second embodiment of the present invention.

As shown in FIG. 8 to FIG. 9 of the drawings, the connector body 20 may further have a plurality of arc-shaped engaging grooves 41' spacedly, circumferentially, and indently formed at the inner surface of the fastening cover mounting portion of the connector body 20'. Each of the engaging grooves 41' may have a trapezoid cross section and an outer end flat surface 411' and an inner end inclined surface 412'. The first shouldering surface 27' may be formed between the outer end flat surface 411' and the first opening portion 22'. The inner end inclined surface 412' may extend between the outer end flat surface 411' and the fourth opening portion 25.

Figure 6:
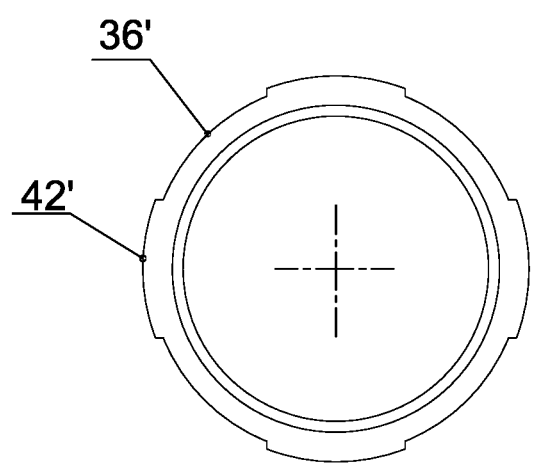
FIG. 6 is a top view of a fastening cover according to a second embodiment of the present invention.
Figure 7:
FIG. 7 is a sectional view of the fastening cover in FIG. 6 according to the second embodiment of the present invention.

As shown in FIG. 6 to FIG. 7 of the drawings, the fastening cover 36' may further comprise a plurality of engaging tongues 42' spacedly and circumferentially protruded from the outer surface of the fastening cover 36' to align and match with the engaging grooves 41' respectively. Correspondingly, each of the engaging tongues 42' may have a bevel surface. The engaging tongues 42' may engage with the engaging grooves 41' respectively to couple the fastening cover 36' at the connector body 20'.

As shown in FIG. 10 of the drawings, a water leakage test is performed for the prior art and the present invention in response to water pressure. In FIG. 10, after the water pipe was connected to the prior art, the prior art leaked when the water pressure reaches 5.0 Mpa. On the other hand, there was no water leak for the present invention when the water pressure reached 10.0 Mpa. In fact, there was no significant water leak for the present invention when the water pressure reached 20.0 Mpa. Therefore, the quick pipe connector of the present invention not only provides a simple and rapid assembling and disassembling operation for the water pipe but also prevent any water leakage after the quick pipe connector is connected to the water pipe.

Comparing with the conventional art, the present invention provides the following distinctive features:

1. The fastening cover is formed in a closed loop structure to enhance the strength, and after the fastening cover is pressed into the fastening cover mounting portion of the connector body, the fastener cover will not be easily detached from the connector body, so as to provide a better connection therebetween.

2. The compression ring and the connector body are two individual components for easily manufacturing.

The present invention, while illustrated and described in terms of a preferred embodiment and several alternatives, is not limited to the particular description contained in this specification. Additional alternative or equivalent components could also be used to practice the present invention.

What is claimed is:

1. A quick pipe connector, comprising:
a connector body having a central hole, an opening, a first opening portion, a fastening cover mounting portion, a fourth opening portion, and a fifth opening portion sequentially formed from said opening to said central hole, wherein a diameter of said fourth opening portion is larger than a diameter of said fifth opening portion, wherein said connector body further has a first shouldering surface formed between said first opening portion and said fastening cover mounting portion, a second shouldering surface formed between said fourth opening portion and said fifth opening portion, and a third shouldering surface formed between said fifth opening portion and said central hole;
a sealing ring disposed at said fifth opening portion of said connector body;
a compression ring having an inner through hole, a first end and an opposed second end, wherein said compression ring is disposed at said fourth opening portion of said connector body at a position that said first end of said compression ring is biased against said second shouldering surface to limit said sealing ring located between said third shouldering surface and said first end of the compression ring;
an engaging member which has a mounting portion and a plurality of engaging teeth extended therefrom;
a fastening cover having a circular shape with closed loop structure and defining a first end and an opposed second end, wherein said fastening cover comprises an annular protruding rim inwardly and radially protruded from an inner circumferential wall of said fastening cover toward a center thereof, wherein said fastening cover is disposed at said fastening cover mounting portion of said connector body, wherein said second end the fastening cover is biased against said first shouldering surface, wherein said mounting portion of said engaging member is limited between said first end of said fastening cover and said second end of said compression ring, wherein said engaging teeth are extended into said inner through hole of said compression ring, said fastening cover further comprising a chamfered edge formed at an inner surface thereof at said second end of said fastening cover, wherein a smaller diameter edge of said chamfered edge is extended from said annular protruding rim of said fastening cover; and
a connector socket which comprises a socket body having a tubular configuration and defining a first end and an opposed second end, wherein said socket body has a tapered surface extended on an outer peripheral surface of said socket body from said first end thereof, wherein a fifth shouldering surface is formed between said tapered surface and said outer peripheral surface of said socket body, wherein said connector socket is slidably and coaxially inserted into said fastening cover at a position that said fifth shouldering surface of said connector socket is slidably passed through and engaged with said annular protruding rim of said fastening cover.

2. A quick pipe connector, comprising:
a connector body having a central hole, an opening, a first opening portion, a fastening cover mounting portion, a fourth opening portion, and a fifth opening portion sequentially formed from said opening to said central hole, wherein a diameter of said fourth opening portion is larger than a diameter of said fifth opening portion, wherein said connector body further has a first shouldering surface formed between said first opening portion and said fastening cover mounting portion, a second shouldering surface formed between said fourth opening portion and said fifth opening portion, and a third shouldering surface formed between said fifth opening portion and said central hole, said connector body having two or more arc-shaped engaging grooves spacedly, circumferentially, and indently formed at an inner surface of said fastening cover mounting portion of said connector body;
a sealing ring disposed at said fifth opening portion of said connector body;
a compression ring having an inner through hole, a first end and an opposed second end, wherein said compression ring is disposed at said fourth opening portion of said connector body at a position that said first end of said compression ring is biased against said second shouldering surface to limit said sealing ring located between said third shouldering surface and said first end of the compression ring;
an engaging member which has a mounting portion and a plurality of engaging teeth extended therefrom;
a fastening cover having a circular shape with closed loop structure and defining a first end and an opposed second end, wherein said fastening cover comprises an annular protruding rim inwardly and radially protruded from an inner circumferential wall of said fastening cover toward a center thereof, wherein said fastening cover is disposed at said fastening cover mounting portion of said connector body, wherein said second end the fastening cover is biased against said first shouldering surface, wherein said mounting portion of said engaging member is limited between said first end of said fastening cover and said second end of said compression ring, wherein said engaging teeth are extended into said inner through hole of said compression ring, said fastening cover further comprising a plurality of engaging tongues spacedly and circumferentially protruded from an outer surface of said fastening cover to align and match with said engaging grooves respectively; and
a connector socket which comprises a socket body having a tubular configuration and defining a first end and an opposed second end, wherein said socket body has a tapered surface extended on an outer peripheral surface of said socket body from said first end thereof, wherein a fifth shouldering surface is formed between said tapered surface and said outer peripheral surface of said socket body, wherein said connector socket is slidably and coaxially inserted into said fastening cover at a position that said fifth shouldering surface of said connector socket is slidably passed through and engaged with said annular protruding rim of said fastening cover.

3. The quick pipe connector, as recited in claim 2, wherein each of said engaging grooves has an outer end flat surface and an inner end inclined surface, wherein said first shouldering surface is formed between said outer end flat surface and said first opening portion, wherein said inner end inclined surface is extended between said outer end flat surface and said fourth opening portion.

4. The quick pipe connector, as recited in claim 3, wherein each of said engaging tongues has a bevel surface.

* * * * *